Nov. 15, 1960   C. EBERT   2,959,989
UNIVERSAL SAW GRINDER
Filed July 22, 1958   7 Sheets-Sheet 1

CARL EBERT,
INVENTOR.

BY
ATTORNEY

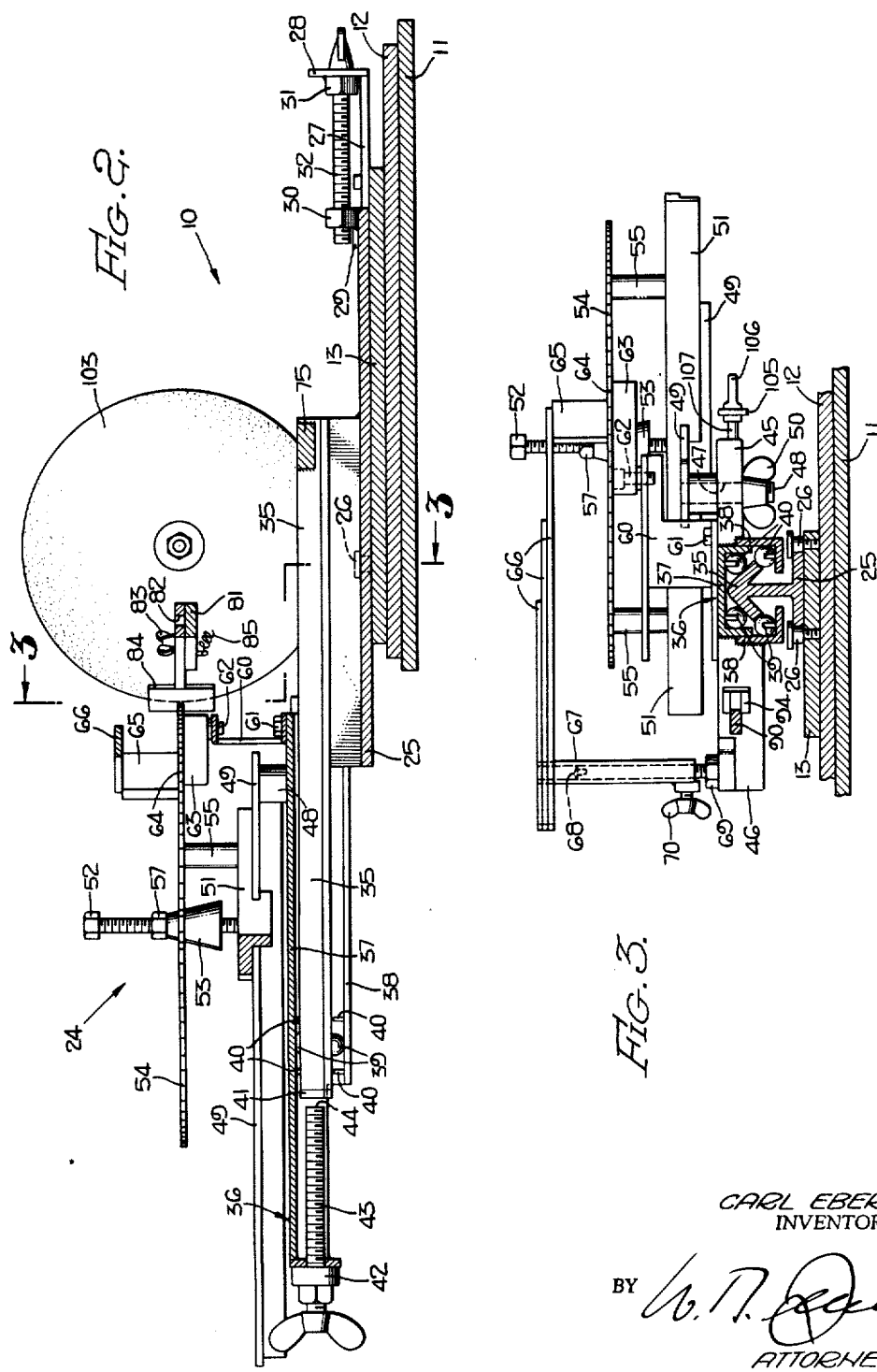

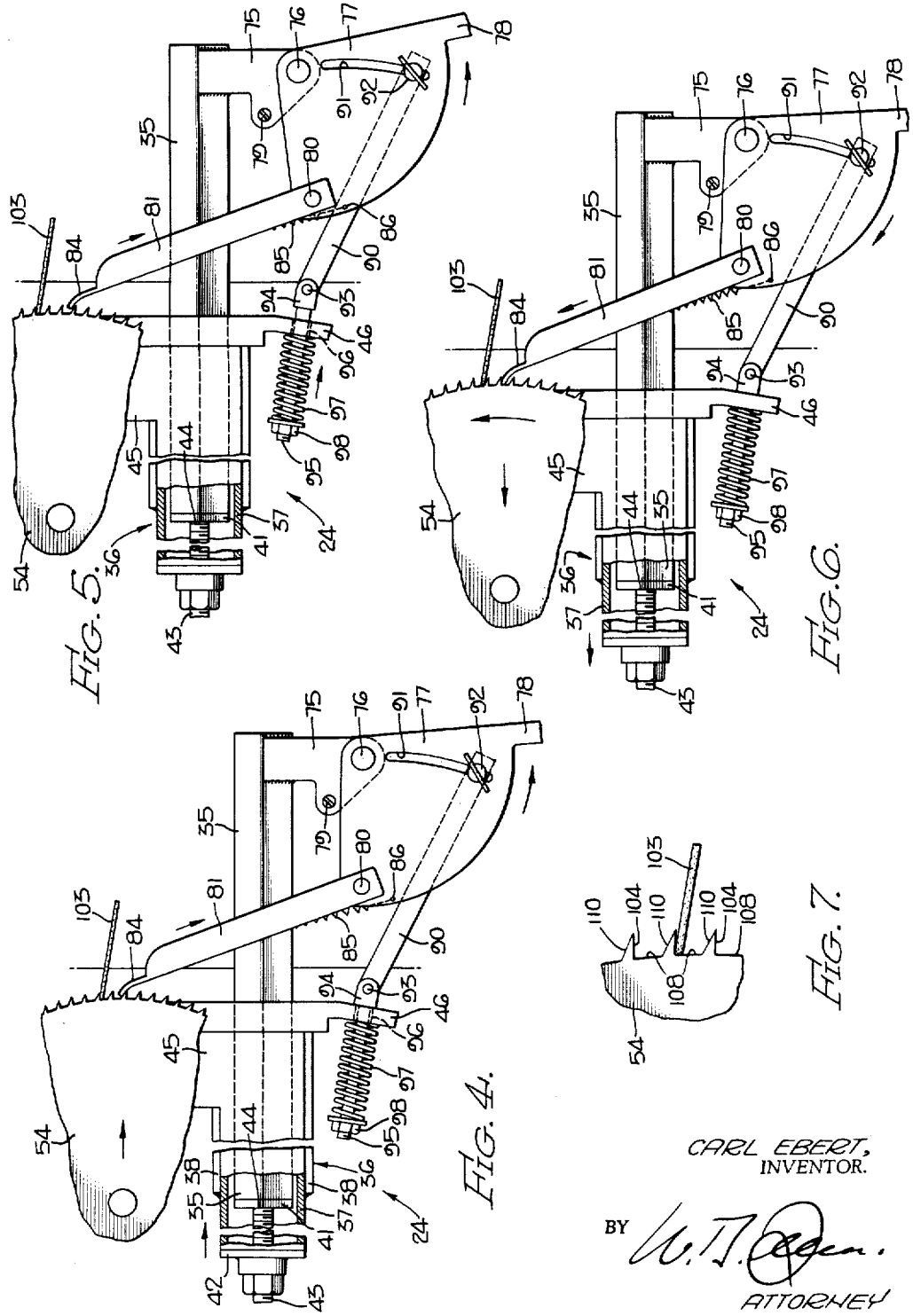

Nov. 15, 1960 C. EBERT 2,959,989
UNIVERSAL SAW GRINDER
Filed July 22, 1958 7 Sheets-Sheet 4
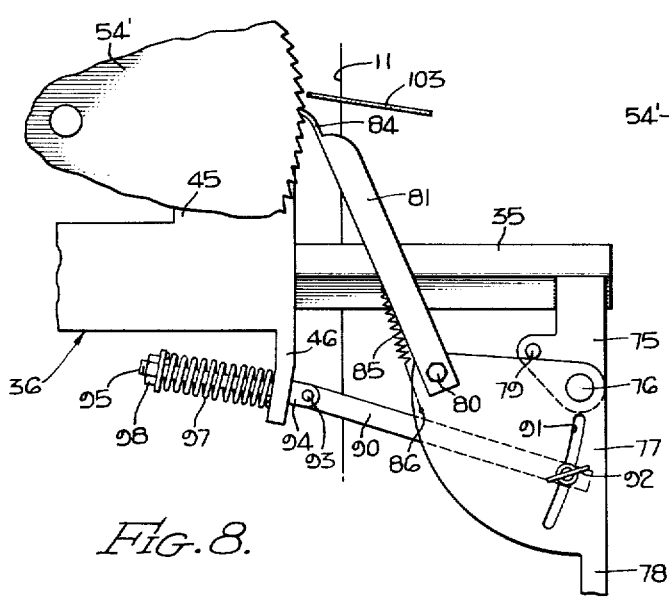
FIG. 8.
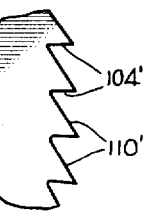
FIG. 9.
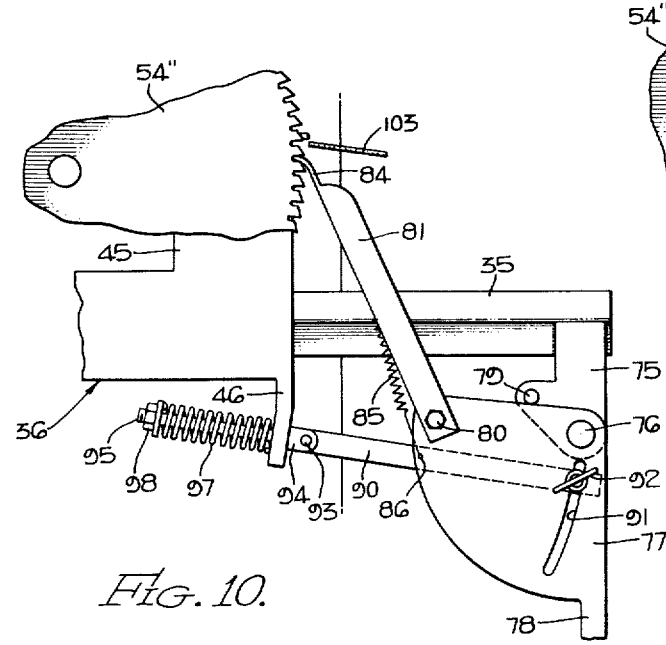
FIG. 10.
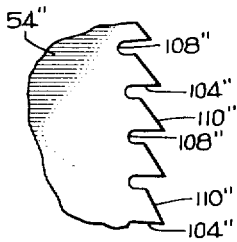
FIG. 11.
CARL EBERT,
INVENTOR.
BY
ATTORNEY

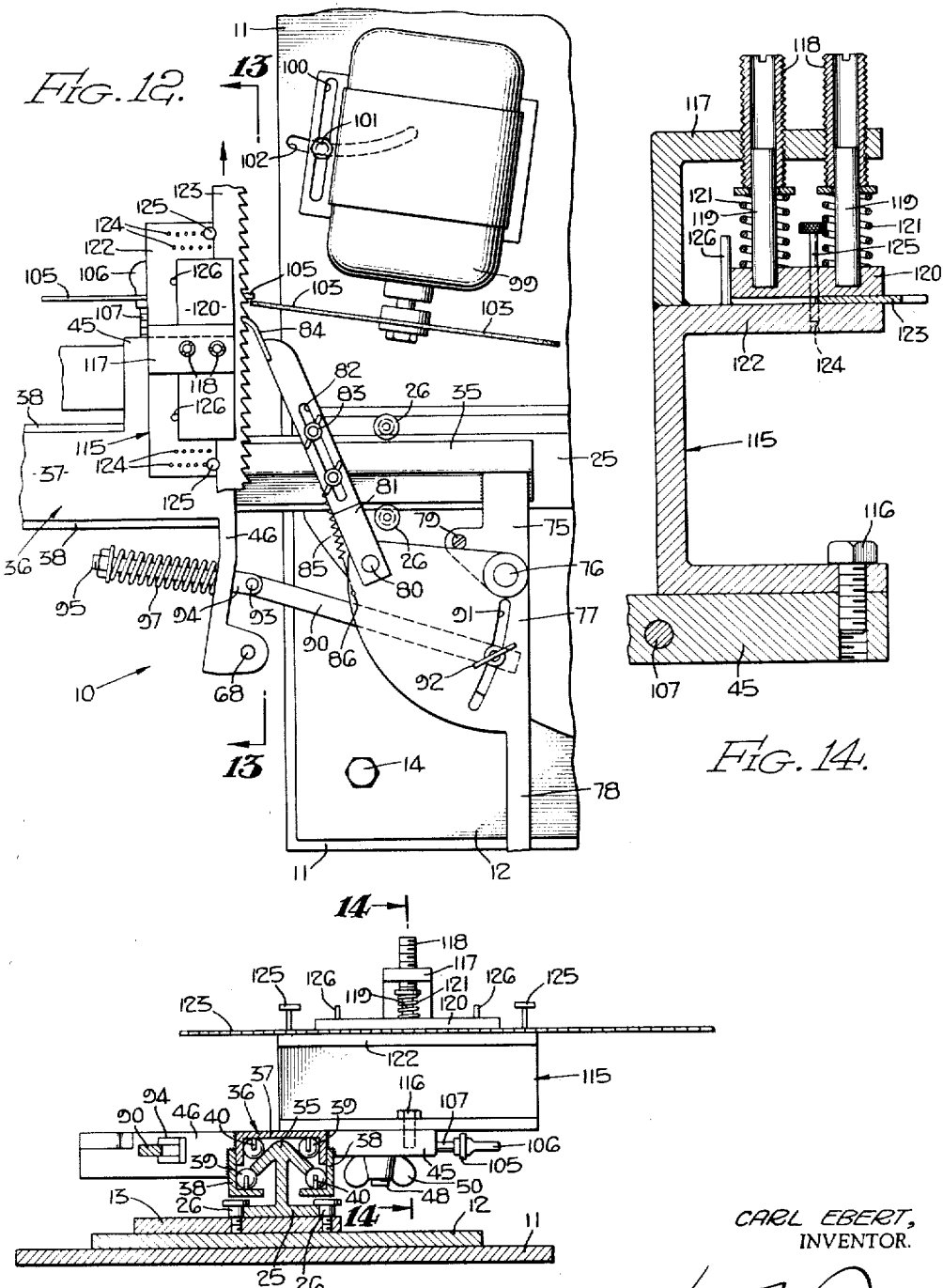

Nov. 15, 1960 C. EBERT 2,959,989
UNIVERSAL SAW GRINDER
Filed July 22, 1958 7 Sheets-Sheet 6

CARL EBERT,
INVENTOR.

BY
ATTORNEY

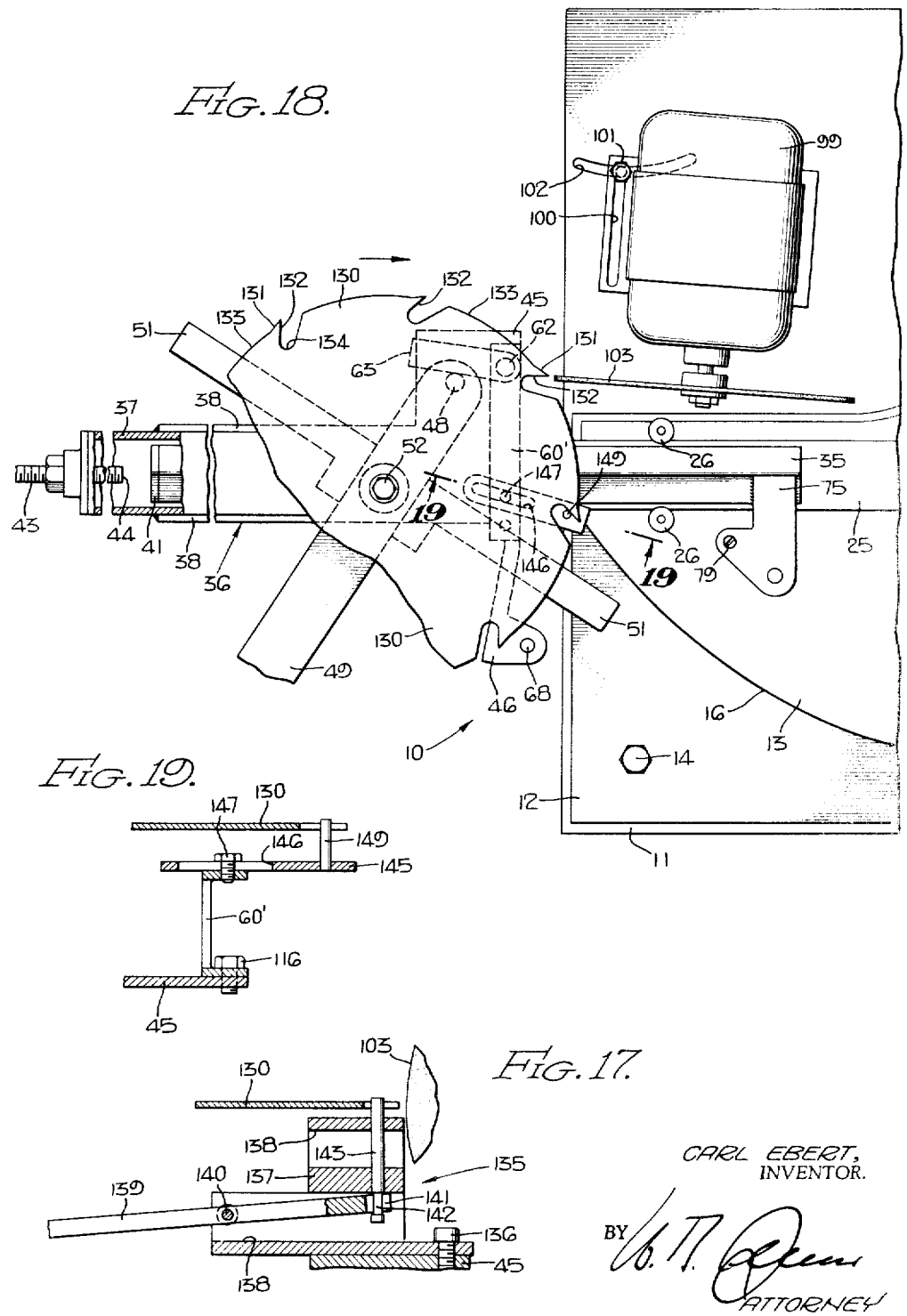

United States Patent Office 2,959,989
Patented Nov. 15, 1960

2,959,989

UNIVERSAL SAW GRINDER

Carl Ebert, 432 S. Curtis Ave., Alhambra, Calif.

Filed July 22, 1958, Ser. No. 750,233

27 Claims. (Cl. 76—77)

This invention relates to saw grinding apparatus and more particularly to an improved universal grinder having provision for accurately grinding and reconditioning both circular and straight saws having teeth of a wide range of sizes and shapes.

Saw grinders have been provided heretofore having various auxiliaries and including numerous adjustments which can be appropriately set to grind the teeth of different saws, but these are subject to certain shortcomings and disadvantages which it is the object of the present invention to obviate. For example, grinders heretofore provided have been so complex and costly that only large industrial users of saws can justify their cost and use. Owing to their great complexity, a skilled specialist is required to operate such machines.

By the present invention there is provided a simple, compact universal grinder which is relatively inexpensive and so easy to operate as to be suitable for use by both large and small shops. The grinder features a linkage having a minimum number of components provided with quickly adjustable connections for varying their positions relative to one another and arranged between a stationary support and a movable carriage on which the saw to be ground is mounted. This linkage, in cooperation with the carriage, is operable to move the saw teeth sequentially through a path identical with the shape of the saw tooth, the saw being indexed by one tooth during each cycle of the carriage and its connecting linkage. The provision of a power driven grinder having a cutting edge located in the path traversed by the saw teeth makes it possible to grind the entire contour of the saw tooth with high precision with each tooth being ground similarly to every other tooth. By virtue of the numerous adjustments and the flexibility in the arrangement of parts, saw teeth of a great range of sizes and shapes can be ground on both circular and straight saws. The grinding of the teeth in sequence includes the grinding of the forehead, the backface and the edge portion if any between tooth roots with the result that the same saw may be ground repeatedly without varying the shape or the depth of the tooth from its original shape, any slight deviations from the original shape being confined to certain areas of the tooth root of no consequence on the effectiveness of the cutting edge proper.

Accordingly, it is a primary object of the present invention to provide an improved universal saw grinder so small and compact as to be readily portable, yet capable of grinding both straight and circular saws having a wide range of tooth shapes and sizes.

Another object of the invention is the provision of a universal saw grinder of such simple and inexpensive construction that it can be owned by both small and large shops and operated by the average skilled workman.

Another object of the invention is the provision of a universal saw grinder obviating the disadvantages of prior grinders and readily adjustable to grind a variety of saw teeth sizes and shapes with high precision with each tooth being ground precisely to the same size and shape under the control of the grinder components independently of the operator's skill once the adjustments have been properly set.

Another object of the invention is the provision of a universal saw grinder having quickly various replaceable auxiliaries adapting the grinder for use to grind a wide variety of saws including straight saws, band saws and circular saws throughout a wide range of sizes of each type.

Another object of the invention is the provision of a univsersal saw grinder having a power driven grinder lockable in a desired fixed position and having a carriage for supporting the saw, the carriage being controlled by a linkage so constructed and arranged that each complete cycle thereof operates to move the carriage and the saw relatively to one another and to the grinder so as to index the saw teeth past the grinder in a path substantially identical with the shape of the tooth itself.

Another object of the invention is the provision of a universal saw grinder utilizing an adjustable linkage and carriage to which the saw is frictionally clutched, the linkage and carriage being constrained to index the saw one tooth at a time through a path at the point of grinding which is identical with the shape of the teeth of the saw being ground and wherein an initial and a final portion of the operating stroke is employed in bringing the saw tooth into and out of grinding position relative to a power driven grinder.

These and other more specific objects will appear upon reading the following specification and claims and upon considering in connection therewith the attached drawings to which they relate.

Referring now to the drawings in which a preferred embodiment of the invention is illustrated.

Figure 2 is a longitudinal sectional view on a vertical plane taken on line 2—2 of Figure 1;

Figure 3 is a cross-sectional view taken along the broken line 3—3 of Figure 2;

Figure 4 is a fragmentary plan view of a portion of the linkage showing the position of parts at completion of the grinding of the tooth forehead;

Figure 5 is a view similar to Figure 4 as the indexing pawl is advanced past a tooth and before the start of the grinding of the saw edge in the area between adjacent tooth roots;

Figure 6 is a view similar to Figure 4 showing the position of parts as grinding of the tooth backface starts;

Figure 7 is an enlarged fragmentary view of the grinding disc during the operation illustrated in Figures 4 and 5;

Figure 8 is a fragmentary view of the indexing linkage shown in position to initiate the grinding of a saw tooth having a backface angle different from that shown in Figures 1 to 7;

Figure 9 is an enlarge view of the tooth shape shown in Figure 8;

Figure 10 is a fragmentary view similar to Figure 8 showing a circular saw having another quite different tooth shape, the details of which are shown in enlarged form in Figure 11;

Figure 12 is a fragmentary top plan view of the indexing linkage with the band saw grinding accessory clamped to the saw carriage, the parts being positioned to initiate grinding of the shown tooth shape;

Figure 13 is a transverse sectional view on a vertical plane taken along line 13—13 of Figure 12;

Figure 14 is a transverse view through the band saw grinding accessory taken on line 14—14 of Figure 13;

Figure 17 is a fragmentary view on a vertical plane taken on line 17—17 of Figure 15 and showing details of the manually retractable stop mechanism;

Figure 18 is a view similar to Figure 15 but showing the grinder apparatus in position to grind the forehead portion of the shown tooth; and Figure 19 is a fragmentary view taken on line 19—19 of Figure 18 showing details of the stop employed when grinding the tooth forehead illustrated in Figure 18.

Figure 1:
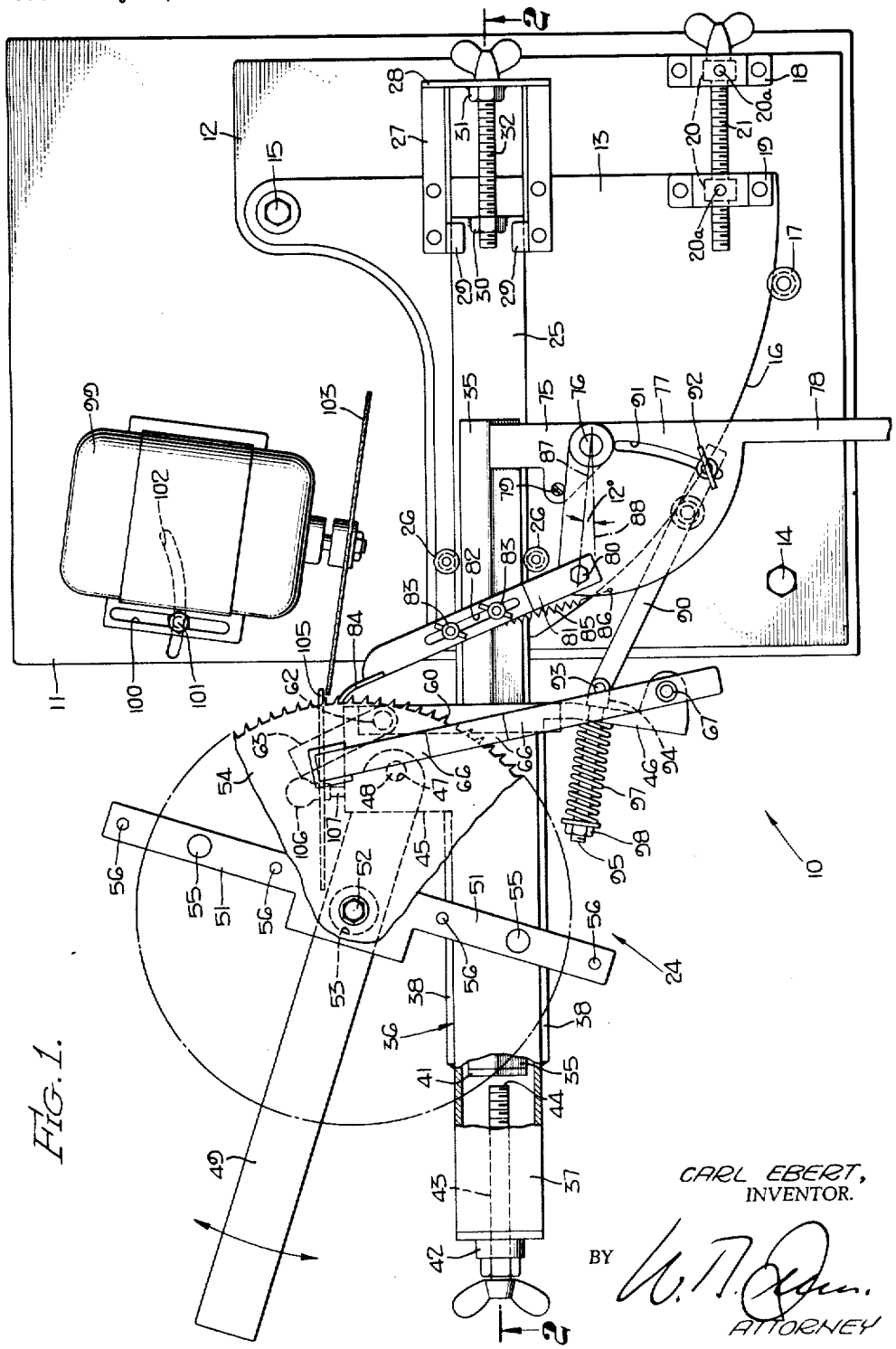
Figure 1 is a top plan view of the universal grinder incorporating the present invention and showing the position of parts for grinding a circular saw having a tooth contour of the type shown, the parts then being in position to start grinding the tooth forehead.

Referring more particularly to Figures 1 to 3, there is shown a universal saw grinder designated generally 10 supported on a generally rectangular base 11 to which there is pivotally connected a main base plate 12 and an overlying secondary base plate 13. Main base 11 may be provided with suitable holes for receiving lag bolts to facilitate anchorage of the grinder to a work bench. Main base plate 12 is pivotally secured to one corner of base 11 as by a shoulder pivot pin 14, and secondary plate 11 is similarly pivoted to main base 12 by a shouldered pivot pin 15 disposed diagonally from pin 14. Suitable clamping means, not shown, may be employed for releasably clamping main base 12 in a desired position relative to base 11. Secondary plate 13 has the general shape of the quadrant of a circle, its circular edge 16 being centered about pivot pin 15. A flanged guide roller 17 anchored to main base 12 beside edge 16 functions as a guide retainer for plate 13 in the manner made clear in the drawings.

Adjustable means for holding plates 12 and 13 in a desired adjusted position relative to pivot pin 15 includes a pair of brackets 18 and 19 respectively anchored to the adjacent edges of plates 12 and 13 and pivotally supporting, as by trunnions 20a, threaded rings 20, 20 through which thumb screw 21 extends. Rotation of the thumb screw permits secondary base plate 13 to be adjusted through a limited arc about pivot pin 15 and provides a fine adjustment by which the edge of a saw tooth may be adjusted with respect to the edge of the grinding disc as will be better understood from following portions of this specification.

As is best shown in Figures 1, 2 and 3, the saw supporting and indexing mechanism, designated generally 24, includes an elongated bracket 25 of inverted T-shape in cross-section, the wide bottom flange of which is slidably supported on base plate 13 between guide rollers 26, 26. The right hand end of bracket 25 as viewed in Figure 1 is slidably supported between a U-shaped bracket 27 the legs of which are connected by an end plate 28. Bracket legs 27 are riveted or otherwise secured to plate 13 and include tabs 29 overlying the opposite lateral edges of bracket 25. Secured to the right hand end of bracket 25 is a threaded nut 30 aligned with a similar nut 31 secured to the up-turned end 28 of bracket 27. A thumb screw 32 extends through nuts 30 and 31 and is effective to adjust bracket 25 lengthwise of the bracket between guide rollers 26.

Welded or otherwise secured to the upper longitudinal edge of bracket 25 is an inverted angle iron 35 (Figure 3) which projects for a considerable distance beyond the left hand edge of the grinder base as viewed in Figure 1. This angle iron provides a trackway on which the saw supporting carriage, designated generally 36, is movable in a manner now to be described.

Referring to Figure 3 it will be seen that the carriage housing comprises a channel member 37 embracing trackway 35 in cooperation with angle iron members 38 fixed thereto as by welding. This housing is held supported on trackway 35 by a plurality of anti-friction rollers 39 arranged adjacent the opposite ends of trackway 35 and held against loss by fixed stop pins 40 (Figures 2 and 3).

Suitable adjustable stop means for limiting the travel of carriage 36 to the right comprises a thumb screw 43 supported in a threaded opening in end plate 42 welded to the outer end of housing channel 37. The inner end 44 of stop screw 43 cooperates with an end plate 41 secured to the end of trackway 35 to limit the relatively short travel required of carriage 36 to effect the desired high precision grinding of the saw teeth.

Projecting laterally and horizontally from the inner end of carriage 36 are a pair of arms 45 and 46, the former being relatively wide and short and the other being relatively long and narrow. Pivotally and adjustably supported in a vertical opening 47 through arm 45 is the vertical stud 48 for a T-shaped saw supporting arm 49. Threaded stud 48 projects through arm 45 and carries a wing nut 50 (Figure 3) for clamping arm 49 horizontally in any adjusted angular position. Extending crosswise at right angles to the length of arm 49 at a point spaced from pivot stud 48 is a fixed cross arm 51 best shown in Figure 1. Threaded into the top side of arms 51 at the intersection with arm 49 is a cap screw 52 the threads of which have a very snug fit with the seating threads in arm 51. Adjustable lengthwise of its mid-portion is a frusto-conical cone 53 for receiving and seating the central opening of a circular saw blade, as for example blade 54 shown seated thereon in Figures 1 and 2. It will be understood that seating cone 53 is adjustable lengthwise of cap screw 52 to the end that a saw blade having a particular size opening will seat on and be accurately centered on the cone as when the underside of the blade is firmly supported against the ends of upstanding posts 55 removably supported in one of a plurality of holes 56 spaced along arms 51, 51. As shown, there are three sets of supporting holes 56 for posts 55, the pair used in a particular case depending upon the diameter of the circular saw being sharpened. The seating cone 53 can be locked in a desired adjusted position along cap screw 52 by a lock nut 57.

Cooperating with the described means for supporting a saw blade on arms 49, 51 and providing a friction clutch for controlling the indexing of the saw is an adjustable clutch device, a suitable form of which will now be described. Referring to Figure 2, there is shown a wide webbed C-channel bracket 60 having its lower flange clamped to the top surface of carriage housing 36 by a cap screw 61. Secured near one end of its upper web by a cap screw 62 is a rectangularly shaped arm 63 having its upper horizontal surface 64 lying in the same plane as the underside of saw blade 54 and the top ends of posts 55, 55. Owing to the use of a single clamping cap screw 62 for holding a clutch arm 63 secured to web 60, it will be recognized that clutch arm 63 may be swung to underlie the saw blade at a point inwardly of the root of the saw teeth and in position to lie oppositely the pressure plate of a cooperating clutch member. This cooperating clutch member is shown in Figures 1 and 2 as comprising a block 65 having its lower end pressed against the top surface of the saw blade from the outer end of the longer one of several mutually supporting strip springs 66 secured to one end of a supporting tube 67. This tube seats over a post 68 threaded at its lower end and held assembled to the outer end of carriage arm 46 by a lock nut 69. A thumb screw 70 threadedly seated in the side of tube 67 serves to lock the spring leaves in a desired setting on post 68 and in such manner that clutch block 65 presses the saw blade against the underlying supporting arm 63 under sufficient pressure to allow controlled indexing of the saw blade about the axis of its seating cone 53. Thus, it will be understood that if greater resistance to the rotation of the saw blade is desired during grinding it is merely necessary to loosen thumb nut 70 and press downwardly on the overlying end of spring 66 until the desired clutching pressure on the saw blade is obtained whereupon the thumb nut 70 is tightened to hold the adjustment.

The adjustable linkage operable to index the saw through repeated paths of highly precise identical contours relative to the cutting edge of the grinding disc forms a particularly important feature of the invention. The components of the indexing linkage and its manner of connection and adjustment will be best understood by reference to Figures 4, 5 and 6 which make clear that this linkage is connected between the right hand end of trackway 35 and the adjacent end of the carriage housing. The anchorage to track 35 here shown as provided by a short arm 75 projects laterally from track 35. Pivoted over a stud 76 projecting upwardly from the outer end of arm 75 is a bell crank 77 having an operating handle 78. The outer end of this handle is broken away but it will be understood that the handle 78 has a suitable hand grip by which bell crank 77 can be swung through a short to-and-fro arcuate path about pivot stud 76, the clockwise movement being limited by a stop pin 79 projecting upwardly from supporting bracket 75 and counterclockwise movement being limited by adjustable stop screw 43 at the outer end of carriage 36. Although stop 79 is shown as a fixed vertical post, it will be understood that it may be replaced by a threaded screw having its axis extending in the plane of bell crank 77 in order that the stop position of the bell crank in the clockwise direction can be varied.

Pivotally secured to the left hand upper end of bell crank 77, as viewed in Figure 1, as by a shouldered pivot pin 80, is an indexing arm 81 preferably formed in two parts. One of these parts is provided with a slot 82 for receiving a pair of thumb nuts 83 extending through holes in the other part and so arranged that the length of the indexing arm can be varied to suit saws of different sizes and diameters. The outer end of the indexing arm is provided with pawl 84 of a suitable shape for engaging between the saw teeth in a manner to index the saw counterclockwise as viewed in Figure 1 during clockwise pivoting of the bell crank about pivot pin 76. Maintaining the indexing pawl 84 in contact with the saw teeth is a tension spring 85 having one end connected to the indexing arm and its other end connected at 86 to the edge of bell crank 77.

An important feature of the bell crank and the indexing arm 81 is the location of the pivot pin 80 and the cooperating stop pin 79 for the bell crank. Referring to Figure 1 it will be noted that when the edge of the bell crank lies against stop pin 79 a dot and dash line 87 interconnecting the axes of pivot pin 76 and 80 preferably makes a small angle of about 12 degrees with a dot and dash line 88 drawn through pivot pin 76 and lying parallel to the longitudinal axis of carriage track 35. When so arranged, the pivot 80 for the indexing arm will be understood to move back and forth relative to line 88 during a single cycle of operation of the indexing linkage. It will be recognized that in grinding saw teeth having long foreheads, pivot 80 will cross line 88 whereas in grinding shallow teeth pivot 80 will approach but will not cross line 88. The specified angle of 12 degrees may vary but this value is representative of good practice for the usual range of saw tooth shapes and sizes.

With respect to Figures 4, 5 and 6, it is pointed out that indexing arm 81 is not shown in all of its details since these figures are intended to represent different functional aspects of the linkage rather than its structural details.

Another very important link of the indexing mechanism includes a link 90 having its right hand end anchorable in any desired position along arcuate slot 91 in bell crank 77 by means of a clamp controlled by a thumb screw and pivotally supporting one end of a link 90. Tightening of thumb screw 92 will be understood to anchor the pivot for link 90 in a desired adjusted position along slot 91 while leaving link 90 free to pivot about the axis of the thumb screw. The opposite end of link 90 is pivoted by pin 93 to the shouldered head 94 of a bolt 95 slidably supported in a bore 96 through arm 46 fixed to carriage housing 37. A compression spring 97 encircling the shank of bolt 95 is held compressed between arm 46 and the adjustable nut 98 of bolt 95, it being apparent that adjustment of nut 98 varies the force with which spring 97 holds the shouldered head 94 of the bolt against the opposite face of arm 46. Accordingly, it will be understood that the relatively stiff spring 97 is effective to move carriage 37 on trackway 35 along with link 90 during both clockwise and counterclockwise movements of bell crank 77 unless and until stop screw 43 at the outer end of the carriage housing abuts stop plate 41 of the trackway. In this happenstance further counterclockwise movement of the bell crank by pressure applied to operating handle 78 is then possible as spring 97 is compressed and the shank of bolt 95 slides to the right through its supporting bore 96 in arm 46. In this position of the parts it will be recognized that further movement of handle 78 to the right as viewed in Figure 1 will withdraw indexing pawl 84 on arm 81 over the back of the underlying tooth of the saw blade without moving the blade.

Completing the description of the apparatus shown in Figure 1, there is provided a power driven grinder comprising an electric motor 99 having a flanged supporting base provided with a long slot 100 along one lateral edge. Cooperating with this slot and with a clamping thumb screw 101 is an arcuate slot 102 provided in base 11, the two slots 100 and 102 acting in conjunction with thumb nut 101 to provide for the adjustment of the motor through a wide range of positions on base 11. Clamped to the shaft of the motor is a thin disc 103 of suitable abrasive material.

The operation of the grinder to sharpen the teeth of a circular saw having the unusually steep backface angle illustrated in Figures 1 to 7 will now be described. The first step is to mount saw 54 on cone 53, this being done while the spring clutch arm 66 and block 65 are shifted to one side after which these elements of the clutch are returned to overlie cooperating clutch arm 63 against which the underside of the saw blade rests in the manner clearly shown in Figure 2. Arm 45 on which the saw blade is mounted is then rotated about its supporting pivot pin 48 until the tooth forehead 104 (Figure 7) is parallel with the longitudinal axis of carriage track 35. To facilitate this important adjustment there is provided on the outer end of carriage arm 45 an indicator device comprising a long flat strip of metal 105 having its midportion clamped to the head of a thumb screw 106 having its smooth-surfaced shank 107 frictionally supported in a well extending horizontally into the end of arm 45 (Figures 1 and 3). It is pointed out that the indicator 105 is formed with a slot enabling the indicator to be slid crosswise of thumb nut 106 so that one end thereof may be positioned directly beneath the forehead of a saw tooth positioned to be ground by disc 103. Inasmuch as the motor supporting the grinder disc 103 may be adjusted to various positions along its base slot 100, it is also desirable that indicator strip 105 be movable to different extended positions closer to or farther away from the axis of the trackway to accommodate saws of different sizes, this end being served by the friction sliding connection provided between shank 107 of thumb screw 106 and the well in which this shank is seated.

From the foregoing it will be appreciated that the proper adjustment of tooth forehead 104 may be accomplished by adjusting the grinder motor 99 and disc 103 until its position relative to the tip of the saw tooth is that shown in Figure 1. Indicator strip 105 is then positioned closely beneath forehead 104 of the tooth as saw supporting arm 49 is swung as necessary to bring the forehead into exact parallelism with the longitudinal edge of indicator 105, following which clamping thumb nut 50 for arm 49 is firmly tightened. Once this adjustment has been made, indicator 105 may be retracted to avoid likelihood of contact with the grinder during sharpening of the saw.

The next operation is the adjustment of stop nut 43 at the outermost end of the carriage housing 37 to limit the carriage travel to that required to advance the cutting edge of grinder disc 103 to the base 108 (Figure 7) of the tooth root. The required short travel of carriage 36 and of the saw blade longitudinally of track 35 to grind the full length of tooth forehead 104 is determined by the adjusted distance between the inner end 44 of stop screw 43 and stop plate 41 on the outer end of track 35, as is made clear by Figures 1 and 2. Once the proper setting of the stop screw 43 is determined, its lock nut is tightened and the operator proceeds to adjust the linkage for the proper indexing of the saw and to assure the grinding of the tooth back face 110 at the proper angle. If necessary, the length of the indexing arm 81 is adjusted so that pawl 84 will engage a tooth close to the one being ground. To this end the two parts of arm 81 are properly adjusted and the lock nuts 83 are then tightened.

The next and final adjustment comprises the proper adjustment of link 90 along arcuate slot 91 of bell crank 77 in order that the saw supporting carriage will be shifted at the proper predetermined rate relative to the counterclockwise indexing of the saw to grind backface 110 at the proper angle, it being pointed out and emphasized that the angle of backface grinding is controlled by the point of anchorage of link 90 along slot 91 in cooperation with other normally fixed design considerations. Owing to the steepness of backface 110 it is evident that the saw blade and its carriage should be moved away from the grinding disc more rapidly than in cases where the backface angle is less steep. Accordingly, to sharpen a tooth having the steep backface illustrated it is necessary to move link 90 to a position close to the outer end of slot 91 and to anchor it tightly in adjusted position with thumb screw 92.

It is also important to point out that adjustment screws 21 and 32 provide desirable fine control means. Screw 32 is effective to shift the saw carriage, the carriage rail and the indexing linkage bodily toward or away from the grinder edge to the end that the grinder is positioned close to but just beyond the tooth end at the beginning of a tooth grinding cycle. Adjusting screw 21 on the other hand is effective to pivot plate 13 about pivot 15 properly to position the tooth forehead relative to grinder 103. Neither of the adjustments 21 or 32 affect in any way the operation and path of movement of the indexing linkage.

The grinder is now in position to grind the teeth of saw 54 sequentially with precision and at a rapid rate simply by swinging the linkage operating handle 78 to and fro about pivot 76 until all teeth have been ground. The starting position of the parts is that illustrated in Figure 1, wherein the edge of the grinder disc is seen to be spaced close to the tip of the tooth forehead 104 (Figure 7) and bell crank 77 lies against stop pin 79. Movement of operating handle counterclockwise, as viewed in Figure 4, acts through link 90 to move carriage 36 and saw 54 to the right as the corner of the grinder disc 103 moves inwardly along forehead 104 until thumb screw 43 abuts stop plate 41. At this time the edge of disc 103 is cutting slightly into edge 108 laterally of the tooth root and pawl 84 of the indexing link 81 is starting to ride over the underlying tooth as is shown in Figure 4. Further counterclockwise movement of arm 78 serves to advance pawl 84 over the underlying tooth as bolt 95 is moved to the right through opening 96 in arm 46 and spring 97 is compressed to the extent required. The energy so stored in the spring is effective in cooperation with the lost motion connection between bolt head 94 and arm 46 to hold carriage 43 against stop 41 during the counterclockwise indexing of the saw during grinding of edge 108 between adjacent tooth roots, the grinding of this edge occurring as handle 78 is moved clockwise and while head 94 of bolt 95 is returning to its normal position against carriage arm 46. Accordingly, during this lost motion movement of bolt 95 spring 97 is effective to hold the carriage stationary against end plate 41 as the saw is rotated counterclockwise to grind edge 108.

The final portion of the grinding cycle for a single tooth effects the grinding of backface 110 which starts with the parts positioned as shown in Figure 6, the grinder disc edge then being at the bottom of backface surface 110 and in position to grind this face as handle 78 continues in a clockwise direction to index the saw while shifting carriage 36 to the left along track 35. When the parts have reached the position shown in Figure 1, with bell crank 77 against stop pin 79, the operating cycle for the grinding of a single tooth is concluded and all parts are positioned to initiate the grinding of the next clockwise tooth by repeating the cycle of operation just described.

It is pointed out and emphasized that when proper adjustments of all parts of the equipment have been made the operation of handle 78 functions to move the peripheral edge of the saw opposite grinder disc 103 through a path identical with the contour of the tooth. Accordingly, it will be recognized that a given saw may be sharpened repeatedly without decrease in the height or shape of the tooth.

Referring now to Figures 8 and 9, a circular saw 54' having teeth of more conventional shape is shown mounted on saw carriage 36 in the manner described above. The teeth of this saw will be observed to have a forehead surface 104' merging with the lower end of backface 110' of the adjacent tooth, the backface of the latter being at a considerably greater obtuse angle with respect to the forehead than in the saw illustrated in Figures 1 to 7.

The adjustment of the grinder apparatus to grind this tooth shape is made following the same procedure described above. Attention is invited to the comments made concerning the adjustment of link 90 along slot 91, it being recalled that this adjustment determines the angle of grind of backface 110'. The proper grinding of the more obtuse angle is assured with link 90 locked approximately midway between the ends of slot 91. In this position of the link, bolt head 94 interconnecting link 90 and carriage arm 46 remains seated against arm 46 throughout the indexing cycle with the result that the saw commences counterclockwise indexing immediately following completion of the grinding of forehead 104'.

It is pointed out that the grinding of teeth having very small included angles between their forehead and backface is obtained with clamping screw 92 seated at the outer end of slot 91. Likewise the grinding of teeth having large included angles is carried out with clamping screw 92 positioned close to the inner end of slot 91. Intermediate positions of the screw are suitable for tooth angles lying between the two extremes just mentioned.

In Figures 10 and 11 are shown the proper linkage adjustments required in grinding teeth having the shape shown on circular saw 54", the principal difference in the adjustment being the locking of link 90 in the proper position close to the inner end of slot 91. It will, of course, be understood that stop screw 43 is adjusted outwardly to accommodate the somewhat greater carriage stroke required to grind the deeper tooth forehead 104". The tooth backface 110" is even more obtuse than surface 110' in Figures 8 and 9, but the proximity of pivot connection 92 of link 90 to pivot pin 76 provides for the uniform and proper grinding of this backface. Furthermore, it is pointed out and emphasized that the portion of slot 91 adjacent to pin 76 is so positioned relative to carriage arm 46 that bolt head 94 passes through a short lost motion movement similar to that described in connection with Figure 5 in order to grind fillet 108' at the base of the tooth forehead.

Referring now to Figures 12 to 14, the band saw grinding accessory is shown mounted on the saw carriage with a section of a band saw clamped therein in grinding position opposite the rim of grinder disc 103. The support and clutching mechanism of this accessory includes a channel-shaped bracket 115 rigidly clamped by a cap screw 116 to arm 45 of the saw carriage housing 36. Rigidly secured to the rear corner of bracket 115 is an inverted L-shaped bracket 117 adjustably supporting a pair of threaded tubes 118 slidably enclosing a pair of guide posts 119 having their lower ends fixed to the movable clutch plate 120. Compression springs 121 surround posts 119 with their lower ends bearing against the clutch plate and their upper ends against washers backed up by the lower ends of tubes 118. It will therefore be apparent that clutch plate 120 is resiliently urged against the upper flange 122 of bracket 115 and cooperates therewith in clutching the body of a straight saw such as the endless band saw 123. Rows of holes 124 arranged in flange 122 frictionally seat removable stop pins 125 against the back edge of saw blade 123 and serve to hold the full depth of the saw teeth exposed beyond the front edge of the accessory flange. Posts 126 are fixed to flange 122 and aid in holding the movable clutch plate 120 aligned with the forward edge 122.

It will be understood that the straight saw clamping accessory 115 functions in cooperation with the remainder of the grinder apparatus in the same manner described in detail in connection with Figures 1 to 7, and more particularly in connection with the grinding of a saw tooth shaped cutting edge shown in Figures 8 and 9. There is, of course, the difference that the straight saw blade is held resiliently clutched between flange 122 and the spring pressed movable plate 120 in a manner permitting the saw to be indexed lengthwise of this accessory in the direction indicated by the arrow in Figure 12 as the linkage mechanism and handle 78 is moved to and fro from a starting position against stop pin 79. It should also be pointed out that indicator 105 is used as described in connection with Figures 1 to 7 to assure the proper positioning of fixture 115 on carriage arm 45 to position the tooth forehead parallel to this indicator and to the path of travel of the carriage. Once this position has been established clamping screw 116 is firmly tightened.

Figure 15:
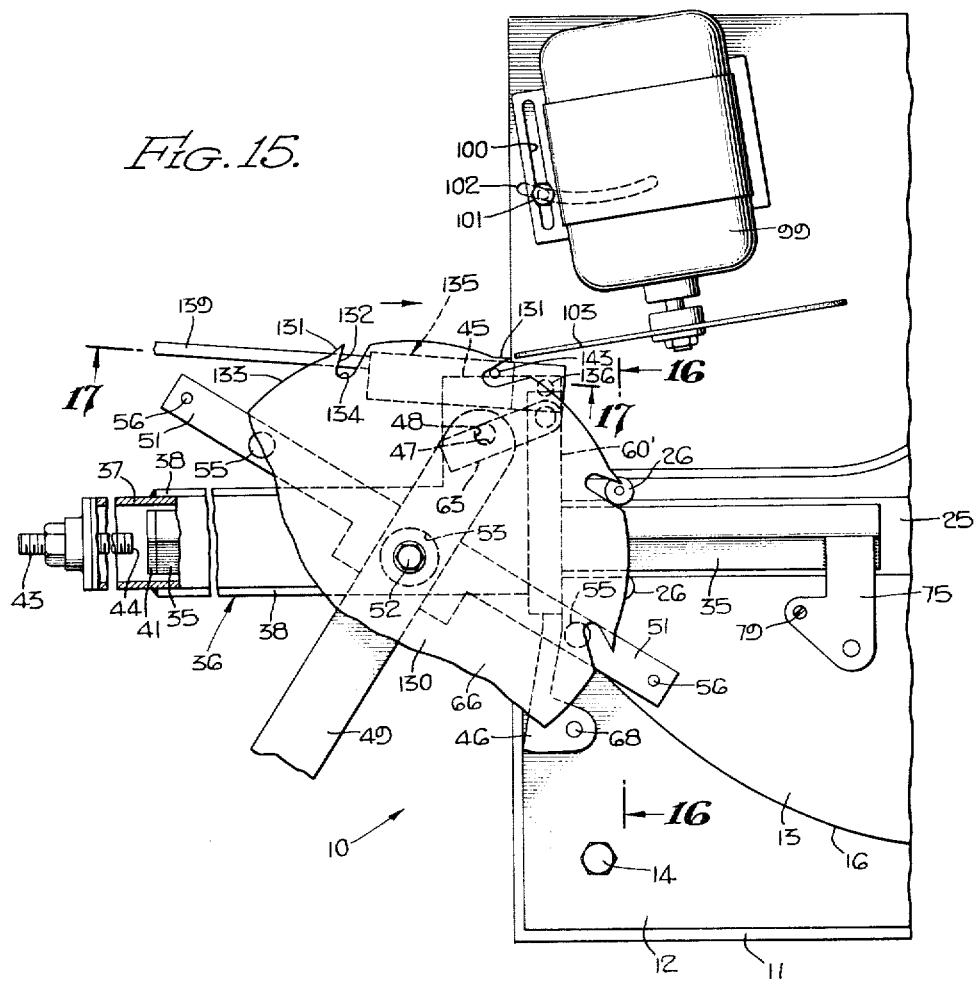
Figure 15 is a fragmentary top plan view of the grinder apparatus showing principal portions of the indexing linkage removed and the apparatus adjusted for grinding a circular saw having the shown tooth shape, the parts being positioned to grind the backface of the tooth and the circumferential edge extending counterclockwise from the base of the backface.
Figure 16:
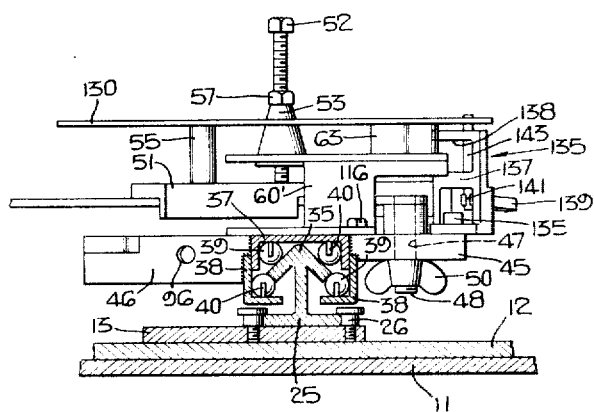
Figure 16 is a transverse sectional view taken on a vertical plane as indicated by line 16—16 on Figure 15.

In sharpening saw teeth of certain unusual shapes, it is necessary to remove the indexing mechanism including bell crank 77, indexing arm 81 and link 90, and to add an auxiliary stop accessory. A typical saw 130 of the type referred to is shown supported in grinding position in Figures 15 to 19. It will be observed that the channel-shaped supporting bracket 60 employed in grinding more conventional circular saw teeth has been replaced with a modified bracket 60' having certain portions of its web cut away to assure clearance with respect to other adjacent components, bracket 60' being rigidly clamped to arm 45 of the saw carriage by cap screw 116 (Figure 16). The lower clutch arm 63 is secured to the upper flange of bracket 60' in the same manner described in connection with Figures 1 to 7 and cooperates with the upper end of posts 55 in supporting saw blade 130. Clutch block 65, spring arms 66 and supporting bracket 67 are removed for the convenience of the operator in holding the saw blade and for advancing it from station to station as will be described presently. The centering support for saw blade 130 is provided by conical member 53 in cooperation with posts 55 and arm 63. Attention is called to the fact that the saw supporting arm 49 is pivoted about its supporting pivot pin 48 to a position such as that illustrated in Figure 15 in order that backface edge 131 of the tooth to be ground will lie parallel to the axis of carriage travel and to the edge of indicator 105. It will be understood that the backface edges 131 and the long arcuate edge 133 extending counterclockwise therefrom are ground separately from the remaining periphery. Thus, the relatively long forehead 132 of the tooth is ground in a separate operation due to its unusual length and shape. The described removal of the indexing linkage including bell crank 77, indexing arm 81 and the carriage transporting link 90 facilitates the free and unobstructed swinging of saw supporting arm 49 until tooth backface 131 lies parallel to the path of travel of the saw carriage. It is pointed out and emphasized that irrespective of the saw tooth design, it is essential that the tooth backface be parallel to the carriage travel. Likewise it is important to have the edge of the abrasive disc 103 properly disposed for movement along the backface, as for example, the position of the grinder shown in Figure 15.

To aid and supplement clutch blocks 63 in holding the saw firmly in its proper grinding position there is provided a manually operable stop accessory designated generally 135 (Figures 15 and 17) which is attachable to the outer end of carriage arm 45 as by a cap screw 136. The main body 137 of this device has one or more passages 138 extending lengthwise therethrough, the lower open-ended passage providing a support for the pivot pin 140 of a stop operating lever 139. The forked inner end 141 of lever 139 straddles grooved portion 142 of a vertically shiftable stop pin 143, the upper end of the latter extending across the saw blade and normally being positioned against the forehead 132 of the tooth being ground. The outer end of operating lever 139 is long enough to counterbalance the stop pin upwardly into its tooth-engaging position, as is made clear by Figure 17.

When it is desired to index the saw clockwise to grind the backface of the next tooth the operator pulls upwardly on the outer end of lever 139 thereby depressing the stop pin 143 and allowing the saw to be manually rotated. As soon as the saw has been rotated a slight distance lever 139 may be released allowing the pin to come to rest against the lower surface of the saw in readiness to drop automatically into notch 134 as the next tooth approaches grinding position. The operator continues to rotate the saw clockwise until the forehead 132 of the tooth comes firmly to rest against the end of stop 143.

In the use of the device to grind the backface 131 and the connecting arcuate rim 133 the operator first makes sure that the carriage stop screw 43 is properly adjusted for the advance of the saw carriage 36 sufficiently to grind the full length of the backface and slightly into the arcuate edge 133. The carriage is gradually advanced manually toward the rotating abrasive disc 103 grinding the backface edge 131 until screw 43 strikes stop 41. The carriage is then held firmly against stop 41 as lever 139 is depressed to retract stop pin 143 permitting the saw blade to be gradually rotated clockwise by hand to grind the arcuate rim 133. As the saw is rotated to a position opposite notch 134 of the next tooth, the carriage is retracted to the left so that the tip of the next tooth will bypass the grinding disc. Once the stop pin is firmly against the forehead of the next tooth to be ground the above described operation is repeated with respect to each tooth until all backfaces 131 and rims 133 have been ground.

The operator then proceeds to grind the tooth forehead after making simple adjustments in the grinder which will be best understood by reference to Figure 18. From a comparison of Figures 15 and 18 it will be noted that a few simple changes are necessary including rotation of carriage stop screw 43 outwardly to allow for the considerably greater carriage travel required to grind the full length of tooth forehead 132. Furthermore, arm 49 must be pivoted sufficiently to bring the forehead into parallelism with the carriage travel and the position of the motor driven grinder disc 103 is changed by the aid of slots 100, 102 and the associated clamp 101 until the plane of the grinder disc is inclined slightly to the tooth forehead.

Also a slightly different type of stop accessory having the construction more clearly shown in Figure 19 is mounted on the carriage housing in lieu of stop accessory 135. The substitute stop device comprises a flat arm 145 having a slot 146 for a cap screw 147 by which the strip may be adjustably secured to the top flange of bracket 60'. A stop pin 149 is fixed to the one end of arm 145 with its upper end positioned to engage the forehead of a tooth adjacent the tooth actually undergoing grinding, as is made clear by Figure 18.

To grind the tooth forehead after the various parts have been properly adjusted, the operator merely slides carriage 36 to the right along trackway 35 advancing the tooth forehead 132 across the edge of the grinder disc 103, the grinding continuing until carriage stop screw 43 strikes stop 41. The carriage is then retracted as the saw blade is tilted sufficiently to clear stop pin 149 thereby releasing the saw for counterclockwise indexing of the next tooth, care being taken that grinding is not started until the forehead of the next tooth is pressed against stop pin 149. After each tooth forehead has been ground as described the saw is in readiness for further use.

From the foregoing it will be appreciated that the described universal saw grinding apparatus may be employed to recondition saws of a great range of sizes and shapes with great accuracy and with assurance that each tooth will be ground in precisely the same manner. If the saw teeth are of non-uniform size and shape due to improper prior grinding, the present apparatus will restore each to identical size and contour and will deepen the notches between teeth to the extent required to maintain or restore the original tooth depth. It will also be understood that saw discs of widely different diameters can be sharpened with equal facility utilizing the disclosed apparatus. Although operation of the apparatus for only a few tooth shapes has been shown it will be appreciated that the numerous adjustments and the great flexibility of the parts permits the sharpening of saws of a great range of sizes and tooth shapes.

While the particular universal saw grinder herein shown and disclosed in detail is fully capable of attaining the objects and providing the advantages hereinbefore stated, it is to be understood that it is merely illustrative of the presently preferred embodiments of the invention and that no limitations are intended to the details of construc- or design herein shown other than as defined in the appended claims.

I claim:

1. Saw sharpening apparatus comprising a main frame, a power driven grinder supported thereon, means for clamping a saw in sharpening position relative to said grinder, linkage means movably supported on said frame and including an operative connection with said saw clamping means, said linkage being operable to move said saw through repetitive steps in each of which the saw teeth are advanced progressively crosswise of said grinder along a path substantially identical in size and shape as the size and shape of the saw teeth whereby said teeth are ground along substantially the entire peripheral edge thereof.

2. Apparatus as defined in claim 1 characterized in that said grinder comprises a motor driven abrasive wheel having a thin edge adapted to enter the saw teeth as the saw is indexed past the grinder edge in a path conforming to the shape of the teeth.

3. Apparatus as defined in claim 2 characterized in that said motor driven abrasive wheel is movably supported on said main frame and includes clamping means for releasably locking said grinder selectively in different operating positions as desirable to meet the grinding needs for a particular size and type of saw to be sharpened.

4. Universal saw grinding apparatus adapted to receive and grind saws of a wide range of sizes and tooth shapes, said apparatus having a main frame, a saw supporting carriage movably supported thereon, a rotary motor-driven thin abrasive disc movably mounted on said frame having means for clamping the same selectively in a plurality of desired operating positions, linkage means having a plurality of arms adjustably connected to a common operating member and including a connection to said carriage and means for indexing the teeth of a saw mounted on the carriage successively crosswise of the rim of said abrasive disc, said linkage being adjustable to move a saw clamped to said carriage across and in contact with the rim of said abrasive disc along a path conforming to the contour of the teeth of the particular saw being sharpened, the path followed by the saw being identical for each tooth undergoing sharpening and being determined by the relative adjustment of the components of said linkage and of the carriage travel.

5. Universal saw grinding apparatus as defined in claim 4 characterized in that said carriage includes means for clamping a circular saw thereon with its teeth positioned close to the rim of said abrasive disc, said linkage including a pawl engageable with the saw teeth and effective to index the saw by one tooth for each complete operating movement of said linkage.

6. Universal saw grinding apparatus as defined in claim 4 characterized in that said carriage includes an adjustable stop for limiting the advance of the saw inwardly of the grinding disc rim beyond the radial depth of the tooth forehead being ground.

7. Universal saw grinding apparatus as defined in claim 4 characterized in that said linkage and carriage are movable through a cycle including a backward and a forward stroke, said linkage and carriage being effective during one of said strokes to advance a tooth forehead generally radially across the edge of the grinder disc, and said linkage being effective during the other of said strokes to index the adjacent saw tooth transversely across the edge of the grinder disc.

8. Universal saw grinding apparatus as defined in claim 5 characterized in that said carriage includes means for holding a circular saw centered for indexing about the axis of the saw together with friction clutch means permitting the saw to be indexed under a predetermined drag sufficient to assure controlled indexing by said linkage means.

9. Universal saw grinding apparatus as defined in claim 5 characterzied in the provision of indicator means having an end lying parallel to the path of travel of said saw-supporting carriage and lying close to the forehead of a saw tooth immediately opposite the rim of the grinding disc, and means for shifting the saw on said carriage to bring the tooth forehead into parallelism with said indicator.

10. Universal saw grinding apparatus as defined in claim 4 characterized in that said means for clamping a saw therein includes a fixedly supported member and a resiliently supported member closely spaced thereto and cooperating to grip the body of a saw blade therebetween at a point rearwardly of the roots of the saw teeth, said saw clamping means including stop means engageable with the rear edge of the saw body.

11. Universal saw grinding apparatus as defined in claim 4 characterized in that said saw clamping means is detachable as a unit from said carriage.

12. Universal saw grinding apparatus as defined in claim 10 characterzied in that said saw clamping means comprises a unitary auxiliary having means for detachably mounting the same on said carriage.

13. Universal saw grinding apparatus as defined in claim 4 characterized in that said saw clamping means comprises a unitary assembly, said assembly including a bracket-supported stationary jaw having a spring biased movable jaw mounted along the edge thereof and cooperating to frictionally grip the body of an elongated saw with the teeth exposed beyond the edges of said jaws, one of said jaws having a series of stop pin openings frictionally seating pins engageable with the rear edge of the saw body.

14. Universal saw grinding apparatus adapted to receive and grind saws of a wide range of sizes and tooth shapes, said apparatus including a base plate pivotally and slidably supporting a secondary base plate superimposed thereon, adjustable means interconnecting said plates for varying the position of one plate relative to the other about a vertical pivot pin coupling said plates together, longitudinally adjustable track means mounted on the exposed face of said secondary base, a saw supporting carriage mounted on said track means, and multiple-link linkage means connected between said track means and said carriage effective as the linkage means is moved through a cyclic movement to advance the tooth of a saw mounted on said carriage through a path corresponding in size and shape to that of a saw tooth to be ground.

15. Saw grinding apparatus as defined in claim 14 characterized in the provision of adjustable stop means between said track means and said carriage for limiting the advance of the carriage in one direction along said track means.

16. Saw grinding apparatus as defined in claim 14 characterized in the provision of spring-biased lost motion coupling means between said carriage and said linkage means, said coupling being effective to transmit movement positively in one direction and ineffective to transmit positive movement in the other direction except within the non-flexing strength capabilities of said spring.

17. Saw grinding apparatus as defined in claim 14 characterized in the provision of a third base plate underlying said first mentioned base plates, means pivotally connecting said first and third mentioned plates at a point remote from said first mentioned pivot pin, and a power driven grinder disc adjustably clamped to said third base plate.

18. Universal saw grinding apparatus adapted to receive and grind saws of a wide range of sizes and tooth shapes, said apparatus including a base plate pivotally supporting a secondary base plate, track means carried by said secondary plate, a saw supporting carriage mounted on and movable along said track means, linkage means between said track means and said carriage for controlling the movement of the carriage, said linkage including pivoting pawl means having an end biased into engagement with the teeth of a saw supported on said carriage and effective to index the saw one tooth for each stroke of the linkage in one direction, said linkage including an adjustable link connection with said carriage, said link connection including a spring-biased lost motion coupling which acts positively when the linkage is moved in one direction but which permits lost motion when the linkage is moved in the other direction under an applied force in excess of the design strength of said spring.

19. Saw grinding apparatus as defined in claim 18 characterized in the provision of adjustable stop means between said track means and said carriage to limit the carriage movement while leaving said linkage free for limited further movement as permitted by said spring-biased lost motion coupling.

20. In saw grinding apparatus adapted to grind the teeth of circular saws, stationary track means having a carriage movably supported thereon, saw supporting means pivotally mounted on said carriage for swinging movement transversely of said carriage and having clutch means for supporting a circular saw while being indexed past a power driven grinding disc, and linkage means interconnecting said carriage and track means including a pawl engageable with the saw teeth and effective as the linkage is moved through a complete cycle thereof to advance a single saw tooth through a path conforming in size and shape to a tooth of the saw being ground.

21. Saw grinding apparatus as defined in claim 20 characterized in that said indexing pawl includes means for varying the effective stroke thereof to a length slightly greater than the circumferential distance between adjacent teeth.

22. Saw grinding apparatus as defined in claim 20 characterized in that said indexing pawl is pivotally connected to a pivoting actuating arm for said linkage, said linkage including a link having at one end a spring-biased lost motion connection with said carriage and having at its other end a slot-and-pin connection, said slot extending arcuately from adjacent the pivot for said actuating arm and being effective in connection with the adjusted position therealong of the last mentioned link to vary the angle of grinding of the back surface of the saw teeth.

23. Universal saw grinding apparatus having base means provided with a motor driven grinder disc shiftable to a wide range of operating positions, elongated track means extending along the upper side of said base means and secured thereto, carriage means mounted for movement along said track means, a saw supporting table having a pivoting connection with said carriage and provided with a mounting stud adapted to extend snugly through the center hole of a circular saw, clutch means for holding a saw on said stud at right angles to the axis thereof, adjustable stop means for limiting the movement of a saw tooth toward said grinder disc, and manually retractable stop means engageable with the notched portion of a tooth and cooperating with said clutch means in holding the saw against indexing during certain grinding operations and retractable to a position permitting indexing of the saw at the operator's election.

24. In automatic saw grinding apparatus of the type having a main frame and a power driven grinder for grinding saw teeth as the same are advanced across the edge of said grinder, that improvement in said grinding apparatus which comprises a reciprocal saw-supporting carriage mounted on said frame and adapted to support a saw while being ground by said grinder, said carriage having a normally stationary track formed by an elongated V-shaped rail in laterally spaced relation thereto, a plurality of antifriction roller elements positioned between said V-shaped rail and said carriage in a manner holding the carriage positively assembled to said rail and free for movement only lengthwise thereof, and means fixed to said carriage for mounting a saw thereon for movement toward and away from as well as across the edge of said grinder.

25. An automatic saw grinding apparatus as defined in claim 24 characterized in the provision of linkage means connected between said main frame, said carriage and a saw blade mounted thereon to advance the teeth of said blade progressively past the edge of said power driven grinder in a path conforming substantially to the shape of the teeth being ground.

26. An automatic saw grinder as defined in claim 25 characterized in that said linkage means includes a plurality of arms adjustably secured together, said arms being adjustable to different positions in such manner as to advance saw teeth of different shapes past said power driven grinder in a path conforming to the shape of the particular saw teeth then mounted on said carriage.

27. An automatic saw grinder as defined in claim 24 characterized in the provision of manually adjustable means for moving said rail longitudinally thereof and relative to said main frame.

(References on following page)

References Cited in the file of this patent

UNITED STATES PATENTS

| | | |
|---|---|---|
| 164,068 | Burgher | June 1, 1875 |
| 315,715 | Bush | Apr. 14, 1885 |
| 360,679 | Gaskin | Apr. 5, 1887 |
| 364,185 | Mix et al. | May 31, 1887 |
| 385,693 | Blackmer | July 10, 1888 |
| 579,837 | Parsons | Mar. 30, 1897 |
| 580,875 | Littlejohns | Apr. 20, 1897 |
| 2,293,231 | Weiland | Aug. 18, 1942 |
| 2,605,654 | Holmes | Aug. 5, 1952 |

FOREIGN PATENTS

| | | |
|---|---|---|
| 189,210 | Switzerland | June 1, 1937 |
| 293,503 | Switzerland | Dec. 16, 1953 |